(12) United States Patent  
Wang et al.

(10) Patent No.: US 8,233,439 B2  
(45) Date of Patent: *Jul. 31, 2012

(54) METHOD AND APPARATUS FOR DETERMINING TRANSMIT POWER

(75) Inventors: Weixin Wang, Shenzhen (CN); Xueli Ma, Shenzhen (CN); Zongjie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,874

(22) Filed: Apr. 20, 2011

(65) Prior Publication Data

US 2011/0188517 A1     Aug. 4, 2011

Related U.S. Application Data

(63) Continuation of application No. PCT/CN2009/074784, filed on Nov. 4, 2009.

(30) Foreign Application Priority Data

Nov. 4, 2008    (CN) .......................... 2008 1 0172290

(51) Int. Cl.
 *H04W 4/00*           (2009.01)
(52) U.S. Cl. ...................... 370/328; 370/310.2; 370/311; 370/318; 370/349; 455/13.4; 455/69; 455/127.1; 455/127.5; 455/343.2; 455/343.3; 455/343.4; 455/422.1; 455/522; 455/574; 713/300; 713/320; 375/252
(58) Field of Classification Search ............... 370/310.2, 370/311, 318, 328–339, 349; 455/13.4, 69, 455/126, 127.1, 127.5, 343.2, 343.3, 343.4, 422.1, 522, 574; 713/300, 310, 320–324; 375/252

See application file for complete search history.

(56) References Cited

U.S. PATENT DOCUMENTS 7,586,977 B2    9/2009   Usuda et al.
(Continued)

FOREIGN PATENT DOCUMENTS

CN          1770655 A      5/2006
(Continued)

OTHER PUBLICATIONS

"3GPP TS 25.214—$3_{rd}$ Generation Partnership Project; Technical Specification Group Radio Access Network; Physical layer procedures (FDD) (Release 6)," Jun. 2005, Version 6.6.0, $3^{rd}$ Generation Partnership Project, Valbonne, France.

(Continued)

*Primary Examiner* — Hoon J Chung
(74) *Attorney, Agent, or Firm* — Leydig, Voit & Mayer, Ltd.

(57) ABSTRACT

A method and an apparatus for determining transmit power are disclosed. The method includes: determining an E-DPDCH gain factor in compressed mode according to the number of E-DPDCH required for initial transmission of data; and determining transmit power of E-DPDCH according to the E-DPDCH gain factor in compressed mode. The E-DPDCH gain factor in compressed mode is determined according to the number of E-DPDCH required for initial transmission of data, and therefore, the E-DPDCH gain factor in compressed mode is determined accurately, the transmit power of E-DPDCH is determined accurately according to the E-DPDCH gain factor, the waste of transmit power of E-DPDCH is reduced, and therefore the system capacity is improved.

6 Claims, 2 Drawing Sheets

U.S. PATENT DOCUMENTS

| | | | |
|---|---|---|---|
| 7,606,212 | B2 | 10/2009 | Kwak et al. |
| 7,729,717 | B2* | 6/2010 | Xu ............................. 455/522 |
| 2006/0176867 | A1 | 8/2006 | Kwak et al. |
| 2007/0155335 | A1* | 7/2007 | Love et al. ................. 455/69 |
| 2008/0051127 | A1 | 2/2008 | Xu |
| 2008/0069035 | A1* | 3/2008 | Pinheiro et al. ............. 370/328 |
| 2009/0227256 | A1 | 9/2009 | Goto et al. |
| 2009/0290559 | A1* | 11/2009 | Pelletier et al. ............. 370/336 |
| 2010/0087202 | A1 | 4/2010 | Ventola et al. |
| 2011/0038305 | A1* | 2/2011 | Mella et al. ................. 370/328 |
| 2011/0188517 | A1 | 8/2011 | Wang et al. |
| 2011/0207419 | A1 | 8/2011 | Wang et al. |

FOREIGN PATENT DOCUMENTS

| | | | |
|---|---|---|---|
| CN | 1855752 A | | 11/2006 |
| CN | 1960197 A | | 5/2007 |
| EP | 1892846 B1 | | 11/2008 |
| WO | WO 2008/034370 A1 | | 3/2008 |

OTHER PUBLICATIONS

"3GPP TSG-RAN WG1 #39—E-DPDCH & E-DPCCH Gain Factor," Nov. 15-19, 2004, $3^{rd}$ Generation Partnership Project, Yokohama, Japan.

International Search Report in corresponding PCT Application No. PCT/CN2009/074784 (Feb. 11, 2010).

Corresponding U.S. Appl. No. 13/250,073 (Nov. 3, 2011).

Written Opinion of the International Searching Authority in corresponding PCT Application No. PCT/CN2009/074784 (Feb. 11, 2010).

"3GPP 25.213—$3^{rd}$ Generation Partnership Project; Technical Specification Group Radio Access Network; Spreading and modulation (FDD) (Release 6)," Mar. 2005, Version 6.2.0, $3^{rd}$ Generation Partnership Project, Valbonne, France.

"3GPP 25.214—$3^{rd}$ Generation Partnership Project; Technical Specification Group Radio Access Network; Physical layer procedures (FDD) (Release 7)," May 2008, Version 7.9.0, $3^{rd}$ Generation Partnership Project, Valbonne, France.

"3GPP 25.214—$3^{rd}$ Generation Partnership Project; Technical Specification Group Radio Access Network; Physical layer procedures (FDD) (Release 8)," Sep. 2008, Version 8.3.0, $3^{rd}$ Generation Partnership Project, Valbonne, France.

"R1-050060—Gain factor setting for E-DCH," TSG-RAN WG1 Meeting #40, Feb. 14-18, 2005, Samsung, Phoenix, Arizona.

"R1-084688—Correction to E-DPDCH gain factor interpolation in compressed mode," 3GPP TSG RAN WG1 Meeting #55, Nov. 10-Nov. 14, 2008, 3rd Generation Partnership Project, Prague, Czech Republic.

"R1-084689—Correction to E-DPDCH gain factor interpolation in compressed mode," 3GPP TSG RAN WG1 Meeting #55, Nov. 10-Nov. 14, 2008, $3^{rd}$ Generation Partnership Project, Prague, Czech Republic.

$1^{st}$ Office Action in corresponding Chinese Application No. 200810172290.2 (Dec. 1, 2011).

Office Action in related U.S. Appl. No. 13/100,516 (Mar. 30, 2012).

Office Action in corresponding U.S. Appl. No. 13/250,073 (Feb. 14, 2012).

Extended European Search Report in corresponding European Patent Application No. 09824408.0 (May 25, 2012).

"R1-083992—Correction to E-DPDCH Gain Factor Interpolation in Compressed Mode," 3GPP TSG-RAN WG1 Meeting #54bis, Sep. 29, 2008, $3^{rd}$ Generation Partnership Project, Valbonne, France.

"R1-084176—Correction to E-DPDCH Gain Factor Interpolation in Compressed Mode," 3GPP TSG-RAN WG1 Meeting #55, Nov. 10, 2008, $3^{rd}$ Generation Partnership Project, Valbonne, France.

* cited by examiner

METHOD AND APPARATUS FOR DETERMINING TRANSMIT POWER

CROSS-REFERENCE TO RELATED APPLICATIONS

This application is a continuation of International Application No. PCT/CN2009/074784, filed on Nov. 4, 2009, which claims priority to Chinese Patent Application No. 200810172290.2, filed on Nov. 4, 2008, both of which are hereby incorporated by reference in their entireties.

FIELD OF THE INVENTION

The present invention relates to communications technologies, and in particular, to a method and an apparatus for determining transmit power.

BACKGROUND OF THE INVENTION

In a Wideband Code Division Multiple Access (WCDMA) system, the transmit power required by an Enhanced Dedicated Channel Dedicated Physical Data Channel (E-DPDCH) can be obtained according to an E-DPDCH gain factor. The E-DPDCH gain factor may be calculated by an extrapolation formula using one reference E-DCH Transport Format Combination (E-TFC). The extrapolation formula is as follows:

$$\beta_{ed,i,harq} = \beta_{ed,ref} \sqrt{\frac{L_{e,ref}}{L_{e,i}}} \sqrt{\frac{K_{e,i}}{K_{e,ref}}} \cdot 10^{\left(\frac{\Delta harq}{20}\right)} \quad (1)$$

In the formula above, $\beta_{ed,ref}$ denotes the E-DPDCH gain factor of the reference E-TFC; $L_{e,ref}$ denotes the number of E-DPDCH used for the reference E-TFC; $L_{e,i}$ denotes the number of E-DPDCH used for the i:th E-TFC (that is, the i:th E-TFC is corresponding to the E-DPDCH whose the E-DPDCH gain factor is currently to be obtained); if a spreading factor of E-DPDCH is 2, $L_{e,i}$ and $L_{e,ref}$ denote the number of channels assuming a spreading factor of E-DPDCH is 4; $K_{e,ref}$ denotes the transport block size of the reference E-TFC; $K_{e,i}$ denotes the transport block size of the i:th E-TFC; and $\Delta harq$ denotes an offset of a Hybrid Automatic Repeat Request (HARQ), and is specified by the upper layer. Table 1 lists the values of $\Delta harq$.

TABLE 1

| $\Delta harq_{Signal\ Value}$ | $\Delta harq_{Power\ Offset\ (dB)}$ |
|---|---|
| 6 | 6 |
| 5 | 5 |
| 4 | 4 |
| 3 | 3 |
| 2 | 2 |
| 1 | 1 |
| 0 | 0 |

After the uplink 16 Quadrature Amplitude Modulation (16QAM) mode is introduced into the WCDMA system, the uplink service rate increases to 11.52 Mbps. With the increase of the service rate, a formula is put forward for calculating the E-DPDCH gain factor under high rate services. This formula uses two reference E-TFCs, and is called an interpolation formula. The interpolation formula is as follows:

$$\beta_{ed,i,harq} = \sqrt{\frac{L_{e,ref,1}}{L_{e,i}}} \cdot$$

$$\sqrt{\left(\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right) \cdot 10^{\left(\frac{\Delta harq}{20}\right)}}$$

In the formula above, $\beta_{ed,i,harq}$ denotes the E-DPDCH gain factor; $L_{e,i}$ denotes the number of E-DPDCH in non-compressed mode; $\beta_{ed,ref,1}$ and $\beta_{ed,ref,2}$ denote the E-DPDCH gain factors of the first and second reference E-TFCs respectively; $L_{e,ref,1}$ and $L_{e,ref,2}$ denote the number of E-DPDCHs used for the first and second reference E-TFCs; if the spreading factor of E-DPDCH is 2, $L_{e,ref,1}$ and $L_{e,ref,2}$ denote the number of channels assuming the spreading factor of E-DPDCH is 4; $K_{e,ref,1}$ and $K_{e,ref,2}$ denote the transport block sizes of the first and second reference E-TFCs; $K_{e,i}$ denotes the transport block size of the i:th E-TFC; and $\Delta_{harq}$ denotes the offset of the HARQ, and is specified by the upper layer.

In the prior art, if the Transmission Time Interval (TTI) is 10 ms in the compressed mode, the calculation of the E-DPDCH gain factor comes in two scenarios: the current frame is a compressed frame, and the current frame is a normal frame.

At least the following problems are found in the prior art:

The E-DPDCH gain factor calculated out in compressed mode in the prior art does not reflect the transmit power required by the E-DPDCH accurately, and the transmit power required by the E-DPDCH which is determined according to the E-DPDCH gain factor is not accurate either. Consequently, part of the transmit power of E-DPDCH is wasted and therefore the system capacity is reduced.

SUMMARY OF THE INVENTION

The embodiments of the present invention provide a method and an apparatus for determining transmit power so as to determine the transmit power of E-DPDCH accurately and improve the system capacity.

To fulfill the foregoing objectives, a method for determining transmit power is provided in an embodiment of the present invention. The method includes:

determining the E-DPDCH gain factor in compressed mode according to the number of E-DPDCH required for initial transmission of data; and determining transmit power of E-DPDCH according to the E-DPDCH gain factor in compressed mode.

Further, an apparatus for determining transmit power is provided in an embodiment of the present invention. The apparatus includes:

a gain factor determining module, configured to determine an E-DPDCH gain factor in compressed mode according to the number of E-DPDCH required for initial transmission of data; and a power determining module, configured to determine transmit power of E-DPDCH according to the E-DPDCH gain factor determined by the gain determining module.

Further still, a base station is provided in an embodiment of the present invention, and the base station includes the foregoing apparatus for determining transmit power.

Further still, a terminal is provided in an embodiment of the present invention, and the terminal includes the foregoing apparatus for determining transmit power.

Compared with the prior art, the present invention brings at least the following benefits: The E-DPDCH gain factor in compressed mode is determined according to the number of E-DPDCH required for initial transmission of data, and therefore, the E-DPDCH gain factor in compressed mode is determined accurately, the transmit power of E-DPDCH is determined accurately according to the E-DPDCH gain factor, the waste of transmit power of E-DPDCH is reduced, and therefore the system capacity is improved.

BRIEF DESCRIPTION OF THE DRAWINGS

To describe the technical solution under the present invention more clearly, the following describes the accompanying drawings involved in the embodiments of the present invention. Apparently, the accompanying drawings outlined below are not exhaustive and shall not constitute any limitation to the scope of the present invention.

DETAILED DESCRIPTION OF THE EMBODIMENTS

The following detailed description is provided with reference to the accompanying drawings to provide a thorough understanding of the present invention. Evidently, the drawings and the detailed description are merely representative of particular embodiments of the present invention, and the embodiments are illustrative in nature rather than exhaustive, and shall not constitute any limitation to the scope of the present invention. All other embodiments, which can be derived by those skilled in the art from the embodiments given herein without any creative efforts, fall within the scope of the present invention.

A method for determining transmit power is provided in an embodiment of the present invention. The E-DPDCH gain factor in compressed mode is determined according to the number of E-DPDCH required for initial transmission of data, and the transmit power of E-DPDCH is determined according to the E-DPDCH gain factor. This method determines the E-DPDCH gain factor in compressed mode accurately. Because the transmit power of E-DPDCH is determined according to the E-DPDCH gain factor, the waste of transmit power of E-DPDCH is reduced, and therefore the system capacity is improved.

Figure 1:
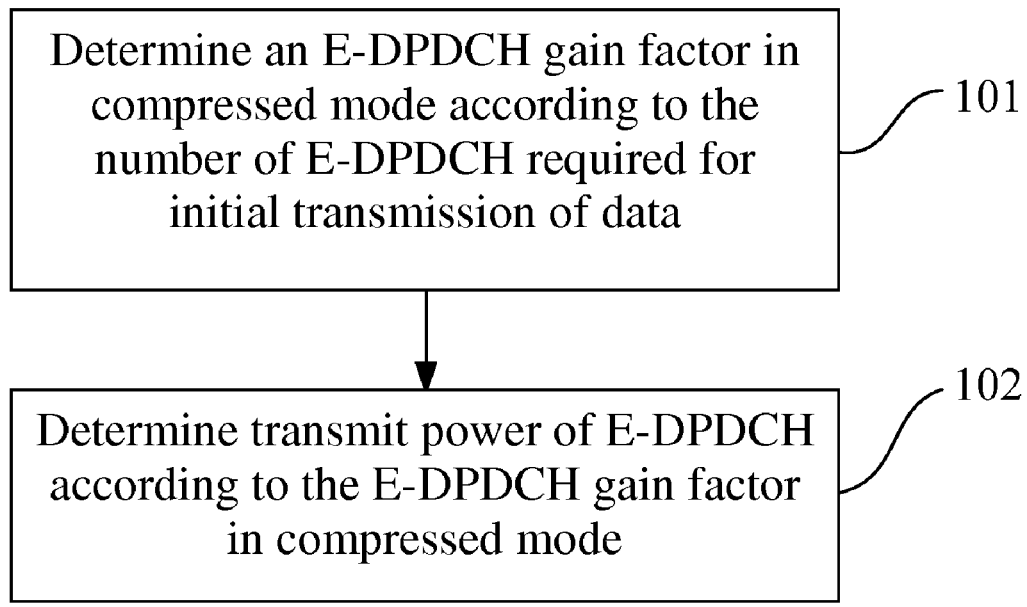
FIG. 1 is a flowchart of a method for determining transmit power in an embodiment of the present invention.

FIG. 1 is a flowchart of a method for determining transmit power in an embodiment of the present invention. The method includes the following steps:

Step 101: Determine the E-DPDCH gain factor in compressed mode according to the number of E-DPDCH required for initial transmission of data.

In this embodiment, when a TTI is 10 ms, the E-DPDCH gain factor in compressed mode is calculated according to the number of E-DPDCH required for initial transmission of data, and interpolation formulas (2) and (3) are put forward.

Assuming $L_{e,I,i}$ denotes the number of E-DPDCH required for initial transmission of data, $\beta_{ed,C,i}$ denotes the E-DPDCH gain factor, and the current frame is a compressed frame, $$\beta_{ed,C,i} = \beta_{c,C,j} \cdot \sqrt{\frac{L_{e,ref,1}}{L_{e,I,i}}} \cdot \qquad (2)$$

$$\sqrt{\left(\left(\frac{\frac{L_{e,ref,2}}{L_{e,ref,1}} A_{ed,ref,2}^2 - A_{ed,ref,1}^2}{K_{e,ref,2} - K_{e,ref,1}}\right)(K_{e,i} - K_{e,ref,1}) + A_{ed,ref,1}^2\right)} \cdot$$

$$10^{\left(\frac{\Delta harq}{20}\right)} \cdot \sqrt{\frac{15 \cdot N_{pilot,C}}{N_{slots,I} \cdot N_{pilot,N}}}$$

Assuming $L_{e,I,i}$ denotes the number of E-DPDCH required for initial transmission of data, $\beta_{ed,R,i}$ denotes the E-DPDCH gain factor, and the current frame is a non-compressed frame, $$\beta_{ed,R,i} = \sqrt{\frac{L_{e,ref,1}}{L_{e,i}}} \cdot \qquad (3)$$

$$\sqrt{\left(\left(\frac{\frac{L_{e,ref,2}}{L_{e,ref,1}} \beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)}$$

$$\sqrt{\frac{15}{N_{slots,I}}} \cdot 10^{\left(\frac{\Delta harq}{20}\right)}$$

In formula (2) and formula (3), $\beta_{c,C,j}$ denotes a Dedicated Physical Control Channel (DPCCH) gain factor used for a j:th Transport Format Combination (TFC) in compressed mode;

$$A_{ed,ref,1} = \frac{\beta_{ed,ref,1}}{\beta_c}, A_{ed,ref,2} = \frac{\beta_{ed,ref,2}}{\beta_c},$$

and $\beta_c$ is a DPCCH gain factor in non-compressed mode; $\beta_{ed,ref,1}$ and $\beta_{ed,ref,2}$ denote the E-DPDCH gain factors of the first and second reference E-TFCs respectively; $L_{e,ref,1}$ and $L_{e,ref,2}$ denote the number of E-DPDCHs used for the first and second reference E-TFCs respectively; if the spreading factor of E-DPDCH is 2, $L_{e,ref,1}$ and $L_{e,ref,2}$ denote the number of channels assuming the spreading factor of E-DPDCH is 4; $K_{e,ref,1}$ and $K_{e,ref,2}$ denote the transport block sizes of the first and second reference E-TFCs respectively; $K_{e,i}$ denotes the transport block size of the i:th E-TFC; $\Delta_{harq}$ denotes the offset of the HARQ, and is specified by the upper layer; $N_{pilot,C}$ is the number of pilot bits per slot on the DPCCH in compressed frame; $N_{pilot,N}$ is the number of pilot bits per slot on the DPCCH in non-compressed frame; $N_{slots,I}$ is the number of non Discontinuous Transmission (DTX) slots in a frame used for initial transmission of data.

Step 102: Determine transmit power of E-DPDCH according to the E-DPDCH gain factor in compressed mode.

One of the methods for determining the transmit power of E-DPDCH is: Obtain a power offset according to the ratio of the E-DPDCH gain factor to the DPCCH gain factor, and then obtain the transmit power of E-DPDCH according to the power offset and absolute power of the DPCCH.

In the method for determining the transmit power in the foregoing embodiment, the E-DPDCH gain factor in compressed mode is determined according to the number of E-DPDCH required for initial transmission of data, and therefore, the E-DPDCH gain factor in compressed mode is determined accurately, the transmit power of E-DPDCH is determined according to the E-DPDCH gain factor, the waste of transmit power of E-DPDCH is reduced, and therefore the system capacity is improved.

Figure 2:
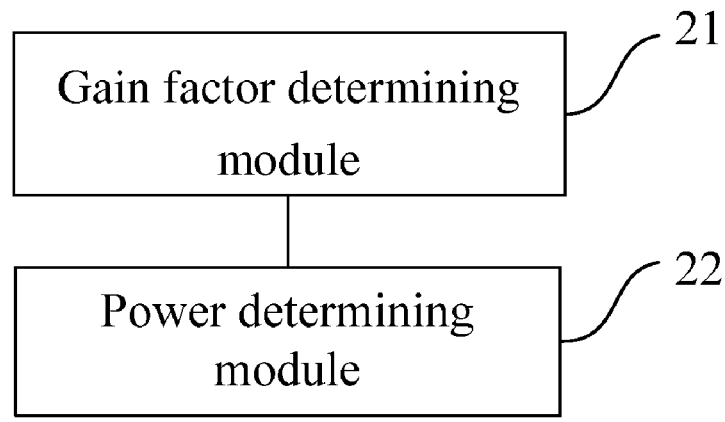
FIG. 2 shows a structure of an apparatus for determining transmit power in an embodiment of the present invention.

As shown in FIG. 2, an apparatus for determining transmit power in an embodiment of the present invention includes:

a gain factor determining module 21, configured to determine the E-DPDCH gain factor in compressed mode according to the number of E-DPDCH required for initial transmission of data; and a power determining module 22, configured to determine the transmit power of E-DPDCH according to the E-DPDCH gain factor determined by the E-DPDCH gain factor determining module 21.

Figure 3:
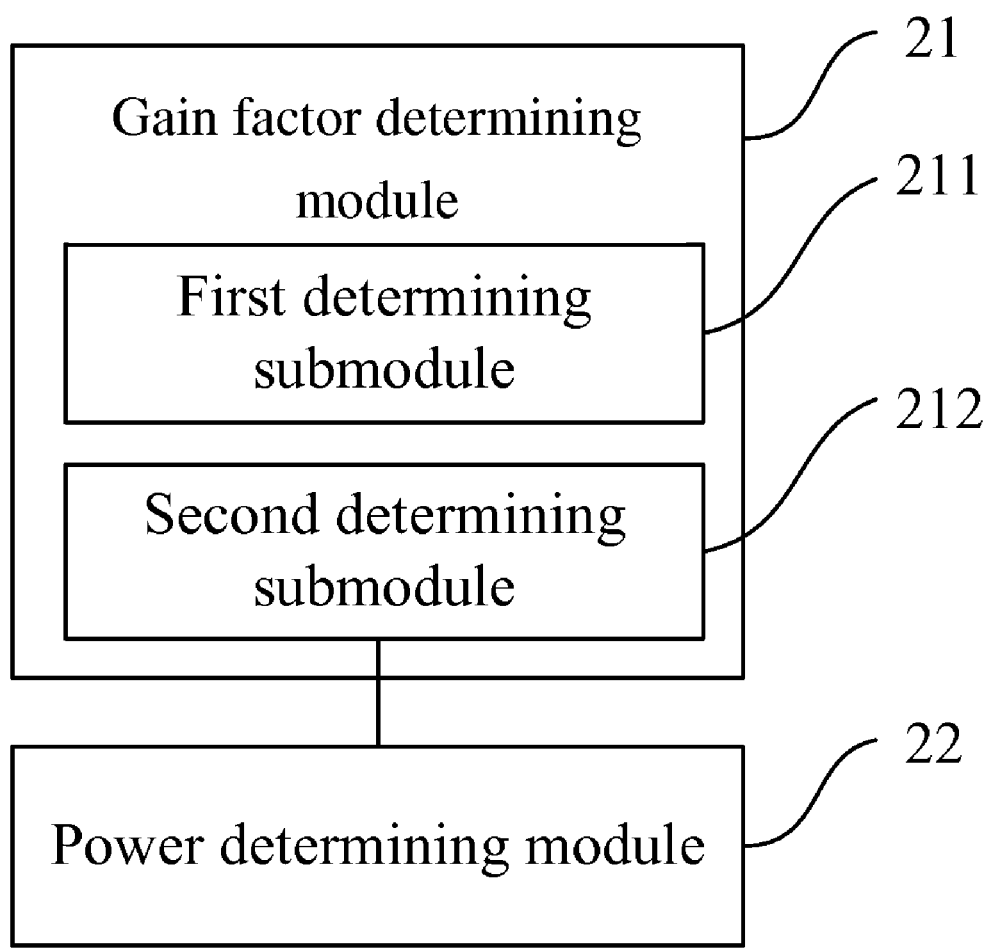
FIG. 3 shows a structure of another apparatus for determining transmit power in an embodiment of the present invention.

As shown in FIG. 3, the gain factor determining module 21 may include a first determining submodule 211 and a second determining submodule 212.

The first determining submodule 211 is configured to determine the E-DPDCH gain factor when $L_{e,I,i}$ denotes the number of E-DPDCH required for initial transmission of data, $\beta_{ed,C,i}$ denotes the E-DPDCH gain factor, and the current frame is a compressed frame:

$$\beta_{ed,C,i} = \beta_{c,C,j} \cdot \sqrt{\frac{L_{e,ref,1}}{L_{e,I,i}}} \cdot$$

$$\sqrt{\left(\frac{\frac{L_{e,ref,2}}{L_{e,ref,1}}A_{ed,ref,2}^2 - A_{ed,ref,1}^2}{K_{e,ref,2} - K_{e,ref,1}}\right)(K_{e,i} - K_{e,ref,1}) + A_{ed,ref,1}^2} \cdot$$

$$10^{\left(\frac{\Delta_{harq}}{20}\right)} \cdot \sqrt{\frac{15 \cdot N_{pilot,C}}{N_{slots,I} \cdot N_{pilot,N}}}$$

The second determining submodule 212 is configured to determine the E-DPDCH gain factor when $L_{e,I,i}$ denotes the number of E-DPDCH required for initial transmission of data, $\beta_{ed,R,i}$ denotes the E-DPDCH gain factor, and the current frame is a non-compressed frame:

$$\beta_{ed,R,i} =$$

$$\sqrt{\frac{L_{e,ref,1}}{L_{e,i}}} \cdot \sqrt{\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2}$$

$$\sqrt{\frac{15}{N_{slots,I}}} \cdot 10^{\left(\frac{\Delta_{harq}}{20}\right)}$$

In the formula above, denotes the DPCCH gain factor used for the j:th TFC in compressed mode;

$$A_{ed,ref,1} = \frac{\beta_{ed,ref,1}}{\beta_c}, \quad A_{ed,ref,2} = \frac{\beta_{ed,ref,2}}{\beta_c},$$

and $\beta_c$ is the DPCCH gain factor in non-compressed mode; $\beta_{ed,ref,1}$ and $\beta_{ed,ref,2}$ denote the E-DPDCH gain factors of the first and second reference E-TFCs; $L_{e,ref,1}$ and $L_{e,ref,2}$ denote the number of E-DPDCHs used for the first and second reference E-TFCs; $K_{e,ref,1}$ and $K_{e,ref,2}$ denote the transport block sizes of the first and second reference E-TFCs; $K_{e,i}$ denotes the transport block size of the i:th E-TFC; $\Delta_{harq}$ denotes the offset of the HARQ; $N_{pilot,C}$ is the number of pilot bits per slot on of the DPCCH in compressed frame; $N_{pilot,N}$ is the number of pilot bits per slot of the DPCCH in non-compressed frame; and $N_{slots,I}$ is the number of non DTX slots in a frame used for initial transmission of data.

In the apparatus for determining the transmit power in the foregoing embodiment, the gain factor determining module 21 determines the E-DPDCH gain factor in compressed mode according to the number of E-DPDCH required for initial transmission of data. Therefore, the E-DPDCH gain factor in compressed mode is determined accurately, the power determining module 22 determines the transmit power of E-DPDCH according to the E-DPDCH gain factor, the waste of transmit power of E-DPDCH is reduced, and therefore the system capacity is improved.

Further, a base station is provided in an embodiment of the present invention, and the base station includes the foregoing apparatus for determining transmit power. The base station may include all or part of the modules of the foregoing apparatus for determining transmit power.

Further, a terminal is provided in an embodiment of the present invention, and the terminal includes the foregoing apparatus for determining transmit power. The terminal may include all or part of the modules of the foregoing apparatus for determining transmit power.

After reading the foregoing embodiments, those skilled in the art are clearly aware that the present invention may be implemented through hardware, or through software in addition to a necessary universal hardware platform. Based on such understanding, the technical solution under the present invention may be embodied in a software product. The software product may be stored in a nonvolatile storage medium (such as a Compact Disk-Read Only Memory (CD-ROM), a Universal Serial Bus (USB) disk, or a mobile hard disk), and may include several instructions that enable a computer device (such as a personal computer, a server, or a network device) to perform the method according to any embodiment of the present invention.

It is understandable to those skilled in the art that the accompanying drawings are only schematic diagrams of the exemplary embodiments, and the modules or processes in the accompanying drawings are not mandatory for implementing the present invention.

It is understandable to those skilled in the art that the modules in an apparatus provided in an embodiment of the present invention may be distributed in the apparatus described herein, or may be located in one or more apparatuses different from the apparatus described herein. The modules may be combined into one module, or split into multiple submodules.

The sequence number of the embodiment above is designed to facilitate description only, and does not represent the order of preference.

Detailed above are several exemplary embodiments of the present invention, and the scope of the present invention is not limited thereto. Any modifications or variations that can be derived by those skilled in the art shall fall within the scope of the present invention.

What is claimed is:

1. A method for determining an Enhanced Dedicated Channel Dedicated Physical Data Channel (E-DPDCH) gain factor in compressed mode, comprising:
   determining the E-DPDCH gain factor in compressed mode according to the number of E-DPDCH required for initial transmission of data;
   when $L_{e,I,i}$ denotes the number of E-DPDCH required for initial transmission of data, $\beta_{ed,C,i}$ denotes the E-DPDCH gain factor, and a current frame is a compressed frame, $$\beta_{ed,C,i} = \beta_{c,C,j} \cdot \sqrt{\frac{L_{e,ref,1}}{L_{e,I,i}}} \cdot$$

$$\sqrt{\left(\left(\frac{\frac{L_{e,ref,2}}{L_{e,ref,1}} A_{ed,ref,2}^2 - A_{ed,ref,1}^2}{K_{e,ref,2} - K_{e,ref,1}}\right)(K_{e,i} - K_{e,ref,1}) + A_{ed,ref,1}^2\right)} \cdot$$

$$10^{\left(\frac{\Delta harq}{20}\right)} \cdot \sqrt{\frac{15 \cdot N_{pilot,C}}{N_{slots,I} \cdot N_{pilot,N}}},$$

wherein $\beta_{c,C,j}$ denotes a Dedicated Physical Control Channel (DPCCH) gain factor used for the j:th TFC in compressed mode;

$$A_{ed,ref,1} = \frac{\beta_{ed,ref,1}}{\beta_c}, A_{ed,ref,2} = \frac{\beta_{ed,ref,2}}{\beta_c},$$

and $\beta_c$ is a DPCCH gain factor in non-compressed mode; $\beta_{ed,ref,1}$ and $\beta_{ed,ref,2}$ denote E-DPDCH gain factors of first and second reference E-TFCs respectively; $L_{e,ref,1}$ and $L_{e,ref,2}$ denote the number of E-DPDCHs used for the first and second reference E-TFCs respectively; $K_{e,ref,1}$ and $K_{e,ref,2}$ denote the transport block sizes of the first and second reference E-TFCs respectively; $K_{e,i}$ denotes the transport block size of the i:th E-TFC; $\Delta_{harq}$ denotes an offset of the HARQ; $N_{pilot,C}$ is the number of pilot bits per slot on the DPCCH in compressed frame; $N_{pilot,N}$ is the number of pilot bits per slot on the DPCCH in non-compressed frame; and $N_{slots,I}$ is the number of non Discontinuous Transmission (DTX) slots in a frame used for initial transmission of data; and transmitting a signal using the determined E-DPDCH gain factor.

2. The method according to claim 1, further comprising:
determining transmit power of E-DPDCH according to the E-DPDCH gain factor in compressed mode.

3. The method according to claim 2, wherein:
determining the transmit power of E-DPDCH according to the E-DPDCH gain factor in compressed mode comprises:
determining a power offset according to a ratio of the E-DPDCH gain factor to the DPCCH gain factor; and
determining the transmit power of E-DPDCH according to the power offset and absolute power of the DPCCH.

4. A method for determining an Enhanced Dedicated Channel Dedicated Physical Data Channel (E-DPDCH) gain factor in compressed mode, comprising:
determining the E-DPDCH gain factor in compressed mode according to the number of E-DPDCH required for initial transmission of data;
when $L_{e,I,i}$ denotes the number of E-DPDCH required for initial transmission of the data, $\beta_{ed,R,i}$ denotes the E-DPDCH gain factor, and a current frame is a non-compressed frame, $$\beta_{ed,R,i} =$$

$$\sqrt{\frac{L_{e,ref,1}}{L_{e,i}}} \cdot \sqrt{\left(\left(\frac{\frac{L_{e,ref,2}}{L_{e,ref,1}} \beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)}$$

$$\sqrt{\frac{15}{N_{slots,I}}} \cdot 10^{\left(\frac{\Delta harq}{20}\right)},$$

wherein
$\beta_{ed,ref,1}$ and $\beta_{ed,ref,2}$ denote the E-DPDCH gain factors of first and second reference E-TFCs respectively; $L_{e,ref,1}$ and $L_{e,ref,2}$ denote the number of E-DPDCHs used for the first and second reference E-TFCs respectively; $K_{e,ref,1}$ and $K_{e,ref,2}$ denote transport block sizes of the first and second reference E-TFCs respectively; $K_{e,i}$ denotes transport block size of the i:th E-TFC; $\Delta_{harq}$ is an offset of the HARQ; and $N_{slots,I}$ is the number of non Discontinuous Transmission (DTX) slots in a frame used for initial transmission of data; and
transmitting a signal using the determined E-DPDCH gain factor.

5. The method according to claim 4, further comprising:
determining transmit power of E-DPDCH according to the E-DPDCH gain factor in compressed mode.

6. The method according to claim 5, wherein:
determining the transmit power of E-DPDCH according to the E-DPDCH gain factor in compressed mode comprises:
determining a power offset according to a ratio of the E-DPDCH gain factor to the DPCCH gain factor; and
determining the transmit power of E-DPDCH according to the power offset and absolute power of the DPCCH.

* * * * *